United States Patent
Zhekov

(10) Patent No.: US 9,509,821 B2
(45) Date of Patent: Nov. 29, 2016

(54) METHOD TO MUTE AUTOMATICALLY PHONE CALLS ON MOBILE COMMUNICATION DEVICE

(71) Applicant: Stanislav Zhekov, Vancouver (CA)

(72) Inventor: Stanislav Zhekov, Vancouver (CA)

( * ) Notice: Subject to any disclaimer, the term of this patent is extended or adjusted under 35 U.S.C. 154(b) by 0 days.

(21) Appl. No.: 14/835,787

(22) Filed: Aug. 26, 2015

(65) Prior Publication Data

US 2016/0065712 A1 Mar. 3, 2016

Related U.S. Application Data

(60) Provisional application No. 62/044,342, filed on Sep. 1, 2014.

(51) Int. Cl.
| | |
|---|---|
| H04M 1/663 | (2006.01) |
| H04M 3/436 | (2006.01) |
| H04M 3/02 | (2006.01) |
| H04M 19/04 | (2006.01) |

(52) U.S. Cl.
CPC ............... *H04M 1/663* (2013.01); *H04M 3/02* (2013.01); *H04M 3/436* (2013.01); *H04M 19/04* (2013.01)

(58) Field of Classification Search
CPC ...... H04M 1/663; H04M 1/573; H04M 3/02; H04M 3/436; H04M 2203/1091; H04M 2207/18; H04M 2207/20; H04M 3/38; H04M 3/54; H04M 1/271; H04M 1/6091; H04M 1/72525; H04M 1/7253; H04W 88/02
See application file for complete search history.

(56) References Cited

U.S. PATENT DOCUMENTS

| | | |
|---|---|---|
| 6,990,187 B2 | 1/2006 | MacNamara |
| 7,613,286 B2 | 11/2009 | Hong |
| 7,797,379 B2 | 9/2010 | Hawkins |
| 8,488,479 B2 | 7/2013 | Li |
| 8,576,828 B1 | 11/2013 | Massey, Jr. |
| 8,634,877 B2 | 1/2014 | Delco |
| 8,811,587 B2 | 8/2014 | Decesaris |
| 8,855,723 B2 | 10/2014 | Lynch, III |
| 8,913,994 B2 | 12/2014 | Edwards |
| 8,917,843 B2 | 12/2014 | Sharpe |
| 8,934,645 B2 | 1/2015 | Coffman |
| 8,971,859 B2 | 3/2015 | Wang |
| 9,060,057 B1 * | 6/2015 | Danis ................ H04M 3/42059 |
| 2002/0085700 A1 | 7/2002 | Metcalf |
| 2011/0128906 A1 | 6/2011 | Arrasvuori |
| 2012/0309365 A1 | 12/2012 | Wang |
| 2014/0045456 A1 * | 2/2014 | Ballai .................... H04W 12/12 455/410 |
| 2014/0105373 A1 * | 4/2014 | Sharpe ................. H04M 3/4365 379/142.05 |
| 2014/0113581 A1 * | 4/2014 | Nassimi ............ H04M 3/42153 455/404.1 |
| 2014/0128047 A1 | 5/2014 | Edwards |
| 2014/0199975 A1 | 7/2014 | Lou |
| 2014/0328478 A1 * | 11/2014 | Chen ...................... H04M 3/436 379/142.06 |
| 2014/0349625 A1 | 11/2014 | Edwards |

(Continued)

FOREIGN PATENT DOCUMENTS

| | | |
|---|---|---|
| CN | 1349339 A | 5/2002 |
| CN | 101715192 B | 9/2014 |

(Continued)

Primary Examiner — Hirdepal Singh

(57) ABSTRACT

A method to mute automatically unwanted phone calls or messages on mobile communications devices with iOS operating system consists of a mobile communications device with iOS operating system, an application software, silent ringtone and a blacklist contact with blacklisted phone numbers that can be frequently updated with community reported harassing phone numbers.

1 Claim, 1 Drawing Sheet

Process of muting unwanted incoming phone calls on iPhone by assigning silent ringtone to blacklisted numbers

(56) References Cited

U.S. PATENT DOCUMENTS

| | | | |
|---|---|---|---|
| 2015/0087280 A1* | 3/2015 | Farrand | H04M 3/436 455/415 |
| 2015/0140977 A1* | 5/2015 | Zhang | H04M 3/42059 455/415 |
| 2015/0288791 A1* | 10/2015 | Weiss | H04M 1/663 379/189 |
| 2015/0302316 A1* | 10/2015 | Buryak | H04L 51/12 706/12 |
| 2016/0057167 A1* | 2/2016 | Bach | H04L 63/1483 726/23 |

FOREIGN PATENT DOCUMENTS

| | | |
|---|---|---|
| WO | WO 0232095 A1 | 4/2002 |
| WO | 2013/141708 A1 | 9/2013 |

\* cited by examiner

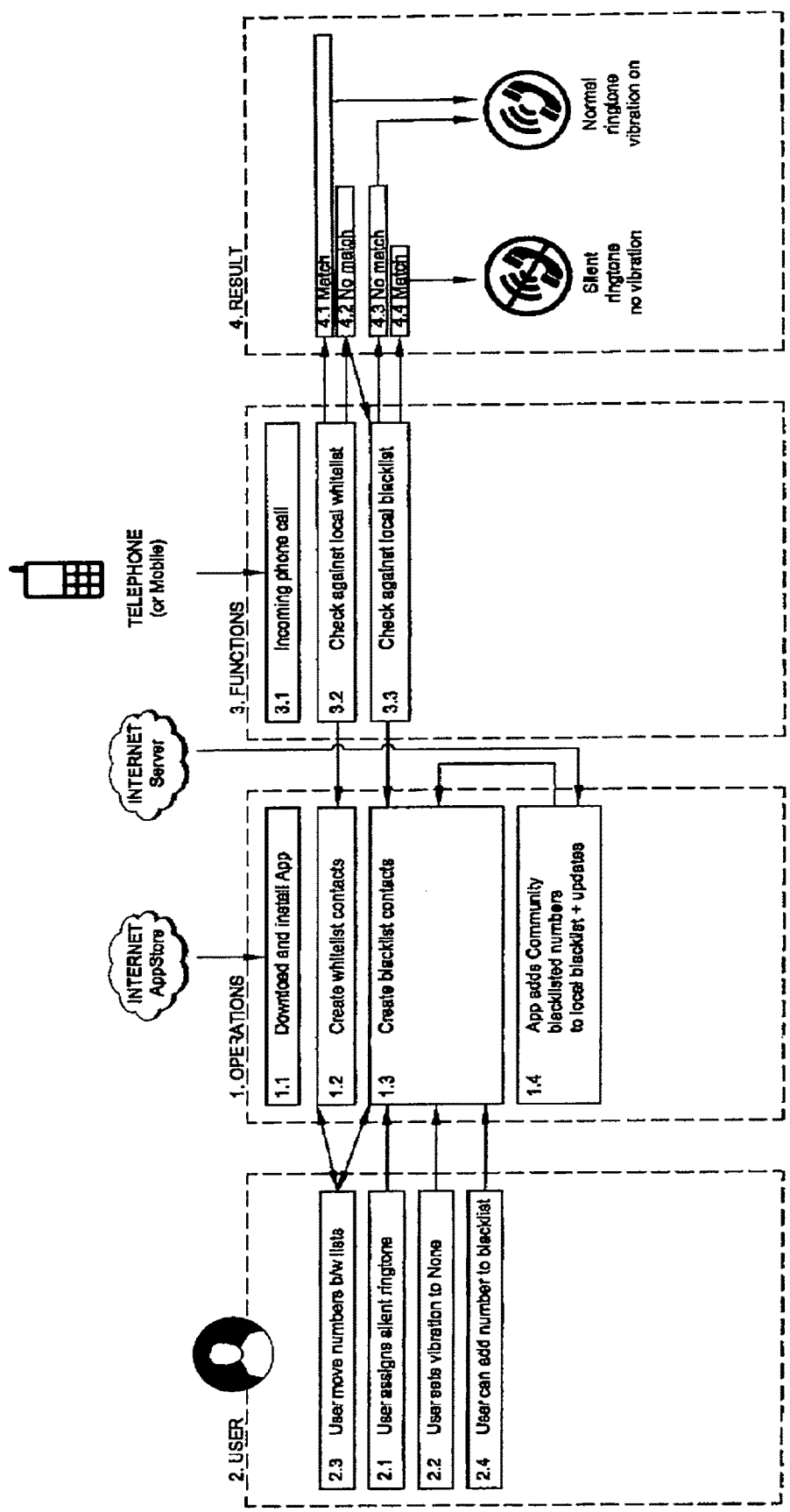

METHOD TO MUTE AUTOMATICALLY PHONE CALLS ON MOBILE COMMUNICATION DEVICE

CROSS-REFERENCE TO RELATED APPLICATIONS

This application claims the benefit of U.S. Provisional patent application 62/044,342 filed on Sep. 1, 2014 hereby incorporated by reference.

STATEMENT REGARDING PRIOR DISCLOSURES BY THE INVENTOR

Not Applicable

REFERENCE TO SEQUENCE LISTING, A TABLE, OR A COMPUTER PROGRAM LISTING COMPACT DISC

Not Applicable

BACKGROUND OF THE INVENTION

The present invention is in the technical field of software programming for mobile communications devices. More particularly, the present invention is in the technical field of software programming for mobile communications devices with iOS operating system. Such devices allow people to communicate with others connecting with family, friends and businesses to exchange information or ask for help.

However, unscrupulous individuals can make illegal unsolicited phone calls to mobile communication devices. Unsolicited harassing phone calls disturb, generate anger and have negative psychological or financial impact on users. By definition telephone harassment occurs when someone intends to annoy, harass or threaten you by making lewd, indecent, obscene comments or requests, calls with no caller ID or repeated unsolicited robocalls.

Unsolicited calls can involve offers to sell financial products, time-share, political advertisements etc. The caller may attempt to deceive phone user into buying products or services. For example, a caller may falsely give the impression a warranty is about to expire, announce that the person has won a prize, but must first pay a processing fee in order to claim the prize, falsely accuse the person of being delinquent on a payment—just to name a few examples.

Unsolicited calls or messages may arrive at inconvenient times such as during dinner or even in the middle of the night. Further, users are often charged for the receipt of these unwanted communications. For example, a wireless carrier may charge the user for the receipt of a call or text message—regardless of whether or not it was an unsolicited advertisement. Calls that are answered may be added to the user's monthly calling minutes. Therefore users of electronic communications devices want to have the ability to automatically mute and eliminate unwanted calls. Although iOS operating system allows for manually blocking certain numbers it does not provide desired level of automation. Thus, there is a need to develop a system and technique to automatically ignore or receive certain incoming calls and messages.

Before iOS 6 developers simply hesitated trying to automate unwanted calls muting or even work on the issue fearing their software may be rejected when submitted for approval. iOS 6 introduced a feature called Do Not Disturb. Some applications attempt to resolve the issue by utilizing this new feature but they require complicated input from users. Further, users complain that such applications need to track their location which is a privacy issue. Further, latest iOS 7 and iOS 8 introduced a feature to manually add a number to a blacklist which actually redirects unwanted calls to a voicemail instead of muting them. None of the prior art provides fully automated method for muting unwanted incoming calls on mobile communications devices with iOS operating system.

BRIEF SUMMARY OF THE INVENTION

The present invention is a system for mobile communications devices with iOS operating system using application software that allows users to mute automatically unwanted incoming phone calls by creating a blacklist contact with blacklisted phone numbers and onetime user's action of assigning a silent ringtone and setting vibration to none for the blacklist contact containing blacklisted phone numbers with frequent updates from community reported harassing phone numbers.

The meaning of the terms Blacklist and Whitelist may vary depending on the specific embodiment. In some instances, the term Blacklist may be used to mean a Silentlist and in some instances the term Whitelist may be used to mean an Allowlist.

BRIEF DESCRIPTION OF THE DRAWING

FIG. 1 —Process of muting unwanted incoming phone calls on mobile communications device by assigning silent ringtone to a blacklist contact Referring now to the invention in more detail, FIG. 1 illustrates the processes and connections between block elements and functions. The solution uses one major component: blacklist contact. The invention structure consists of four blocks as below:
 1—Operations block
 1.1 Download and install App
 1.2 App creates blacklist contact
 1.3 App adds community reported blacklisted numbers to the blacklist contact plus updates
 2—User actions block
 2.1 User assigns silent ringtone to the blacklist contact
 2.2 User sets vibration to None for the blacklist contact
 2.3 User can add numbers to the blacklist contact manually
 3—Functions block
 3.1 Incoming call
 3.2 Check against the blacklist contact
 4—Result block
 4.3 No match found in blacklist contact
 4.4 Match found in blacklist contact
 Responses
 Normal ringtone, vibration optional
 Silent ringtone, no vibration

DETAILED DESCRIPTION OF THE INVENTION

In more detail, still referring to the invention FIG. 1 the sequence of operations and functionality is as follows: The starting point is 1.1—Download and install application software from the iTunes AppStore via Internet connection. The application software automatically creates a blacklist contact 1.2 on the mobile communications device. The application software also downloads and adds to the blacklist contact 1.2 community reported blacklisted numbers 1.3. Then only two actions are required from the user: to assign silent ringtone 2.1, and to set vibration to None 2.2 for the blacklist contact 1.2. At this point everything is set up and the invention is functional. When an incoming phone call or message 3.1 comes to the phone, the application software on the phone compares 3.2 the caller's phone number to the items in the blacklist contact 1.2 and if there is no match 4.1, then the phone rings or vibrate normally, if a match is found 4.2, then the phone does not ring neither vibrate thus the user is not notified about this unwanted incoming call and not disturbed. The blacklist contact 1.2 is being regularly and automatically updated with new numbers from community blacklist 1.3 via the Internet.

In further detail, still referring to the invention FIG. 1 the system automatically compares the identifying phone number of incoming calls 3.1 and messages with records in a blacklist contact 1.2 and respond accordingly by muting 4.2 the incoming calls originated from a number in the blacklist contact 1.2 and accepting calls 4.1 with normal ringtone or vibration, from numbers that are not in the blacklist contact 1.2. To mute unwanted calls the system uses a silent ringtone 2.1 assigned to blacklist contact 1.2. The system automatically creates a blacklist contact 1.2 with many phone numbers in it. The user then assigns manually silent ringtone 2.1 and sets vibration to None 2.2 for all the numbers in the blacklist contact 1.2 at once. Phone numbers in the blacklist contact 1.2 are being frequently updated from community complaints database 1.3 residing in a web server on the Internet. This eliminates the necessity for the user of the mobile communications device to manually mute some phone numbers since they might have been already added to the community blacklist 1.3 by others. The mobile communications device user still has the opportunity to manually add phone numbers 2.3 to the blacklist contact 1.2.

In more detail, still referring to the invention as shown in FIG. 1 the following features and functions are provided by the invention: Feature 1—mute 4.2 unwanted incoming phone calls 3.1. Function: Application software automatically compare 3.2 the incoming call 3.1 identifying phone number with records in a blacklist contact 1.2 and respond accordingly by muting 4.2 the incoming calls originated from a number in the blacklist contact 1.2 and accepting calls 4.1 from numbers that are not in the blacklist contact 1.2 with normal ring or vibration. Feature 2—Manually add phone numbers 2.3 to the blacklist contact 1.2. Function: User adds manually 2.3 unwanted phone numbers to the blacklist contact 1.2.

Referring now to the invention as shown in FIG. 1 it uses a silent ringtone 2.1 that can be obtained in two ways as follows: Option 1 the user needs to have a Mac or PC in order to sync the free silent ringtone that comes as part of the application. It can be found in the iTunes file sharing next to the app in the iTunes application. Further there is Option 2 that the user of a mobile communications device can download a paid silent ringtone via iTunes application on the phone, Mac computer or PC in case s/he doesn't have one already.

The advantages of the present invention include, without limitation that unwanted incoming calls are being automatically muted on mobile communication devices with iOS operating system. It eliminates the need for the user to manually mute each and every unwanted call one by one. The invention creates automatically a blacklist contact 1.2 on the phone. The blacklist contact 1.2 is being frequently updated with recent community reported phone numbers 1.3. Calls from blacklisted phone numbers in the blacklist contact are muted and ignored automatically. The invention eliminates negative emotions and unnecessary additional stress and anger generated by unsolicited phone calls and messages. Further, silencing and ignoring unsolicited phone calls saves user's money in places where the recipient is charged for accepting a phone call. The method prevents annoying disturbances. The invention works seamlessly in the background regardless of provider, plan or location. Further, the invention requires minimal user input and processing resources. Once installed the app doesn't need Internet access in order to function.

The present invention works on mobile communication devices with iOS operating system where currently calls can only be muted manually one by one. This invention automates the process of muting unwanted incoming calls on mobile communication devices with iOS operating system. Further, it automatically updates the numbers in the blacklist contact with fresh entries from community supported database. Users can still manually add phone numbers to the blacklist contact to be muted.

In broad embodiment, the present invention is a software application that automatically mutes unwanted incoming calls on mobile communication devices with iOS operating system using silent ringtone and blacklist frequently updated with community reported phone numbers.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A method for mobile communications device, comprising:
    creating a new single blacklist contact on the mobile communications device to store all harassing phone numbers by downloading and installing from the Internet or otherwise installed application on the mobile communications device, wherein the mobile communications device is operating on iOS operating system, and the new single blacklist is created automatically;
    creating a new single whitelist contact automatically on the mobile communications device by the software application to store other than harassing phone numbers;
    assigning, by one time user's action, a silent ringtone to the automatically created new single blacklist contact for storing all harassing phone numbers on the mobile communications device without changing device's mode;
    setting, by one time user's action, vibration to None for the new automatically created blacklist contact for storing all harassing phone numbers on the mobile communications device without changing device's mode;
    adding crowd reported harassing phone numbers automatically by the software application into the new automatically created blacklist contact for storing all harassing phone numbers on the mobile communications device without changing device's mode;

adding phone numbers by the user, into the new automatically created blacklist contact for storing all harassing phone numbers on the mobile communications device;

reporting harassing phone numbers by the user, to a community complaints data base on a server from the mobile communications device via the software application;

optionally moving phone numbers by the user, from the new automatically created blacklist contact for storing all harassing phone numbers into the new single whitelist contact for storing other than harassing phone numbers on the mobile communications device;

optionally moving phone numbers by the user, from the new single whitelist contact for storing other than harassing phone numbers into the new automatically created blacklist contact for storing all harassing phone numbers on the mobile communications device;

automatically comparing at the mobile communications device by the software application, an incoming electronic communication identified by a phone number with phone numbers in the automatically created blacklist contact containing all harassing phone numbers without using additional modules, scoring or markings;

determining by the software application, based on the comparison of the phone number without using additional modules, scoring or markings, if the incoming electronic communication should be treated as unwanted or else the incoming electronic communication should be treated otherwise;

if a match is found by the software application in the automatically created single blacklist contact containing all harassing phone numbers for the identifying phone number of the incoming electronic communication the incoming electronic communication is silenced automatically and the mobile communications device will not produce sound or vibration, and if a match is not found by the software application in the automatically created single blacklist contact containing all harassing phone numbers for the identifying phone number of the incoming electronic communication the incoming electronic communication is accepted as allowed and the mobile communications device will produce sound or vibration.

* * * * *